Nov. 20, 1934.　　　　G. ZAPF　　　　1,981,536

HIGH TENSION ELECTRIC CABLE

Filed March 25, 1931

G. Zapf
INVENTOR

By: Marks+Clerk
ATTYS.

Patented Nov. 20, 1934

1,981,536

UNITED STATES PATENT OFFICE 1,981,536

HIGH TENSION ELECTRIC CABLE

Georg Zapf, Cologne, Germany, assignor to Felten & Guilleaume Carlswerk Actien-Gesellschaft, Cologne-Mulheim, Germany Application March 25, 1931, Serial No. 525,300
In Germany April 14, 1930

1 Claim. (Cl. 173—264)

In high tension electric cables which are filled with oil, an oil reservoir is provided at the ends of the cable in order to take into consideration the expansion of the oil due to temperature changes. When the cable is energized, the volume of the oil is increased in consequence of the heat produced by the current and the oil passes from the cable into the reservoir. Vice versa, when the cable cools down, the oil passes from the reservoir into the cable in consequence of the decrease in the volume of the oil. In the case of very long cables, the equalization of the pressure does not take place sufficiently quickly in such an arrangement to avoid completely the formation of hollow spaces, so that the resistance of the cable to electrical disruptions is reduced. This phenomenon is especially noticeable in the case of multicore cables in which the free spaces between the individual conductors are filled with strands.

The present invention relates to an oil-filled cable installation in which the drawback above referred to is efficiently overcome by the manner of supplying the oil. In order to reduce the resistance which the oil encounters in the cable as much as possible, use is made of such cables known per se in which no strands are provided between the individual conductors of the multicore cable and the common lead sheathing, and in which the free spaces between the cores are completely filled with oil and consequently the expansion and the contraction of the oil in the spaces between the cores can take place without any obstacle. According to the invention parallel to the cable length consisting of cables of the construction referred to there is provided a pipe filled with oil, which pipe is connected by means of tubular members with the free spaces between the cores within the cable (for instance at the junction points of the cable). The provision of such a pipe along the cable has the advantage that first of all the provision of separate vessels at the ends of the cable are entirely dispensed with because the pipe serves as a reservoir along its whole length and the equalization takes place locally at numerous points of the cable; preferably the parallel pipe is arranged at a higher point than the cable.

Figures 1-3 of the accompanying drawing illustrate the cable installation and various details.

The use of the oil pipe parallel with the cable has the advantage that when the cable is laid in the ring system, even when use is made of pipes of small cross-section, all the points of the cable can be kept at uniformly high pressure from a single reservoir placed higher than the cable, by means of feeding pipes.

At definite distances in the pipes there are connecting pipes having valves therein opening toward a cable pipe whereby when the temperature of the oil increases the expansion of the oil in the cable and its exit from the cable is prevented and the pressure of the oil in the cable is increased, whereby the di-electric strength of the cable is increased.

In order to render the lead sheathing more resistant to the increased internal pressure, the same is provided with a resistant steel armouring.

According to a further feature of the invention, the oil supply pipes which run parallel with the oil-filled cable are made of lead, so that they can easily be bent and be wound on reels, so that they can be laid together with the electric cable. As a pressure may be exerted upon the lead pipe internally, when use is made of pressure equalization valves or when use is made of an oil filling which is subjected to external pressure, the lead pipe (as well as the connecting pipes) are surrounded by profile wires in the manner of a closed armouring, being thereupon wound round in an opposite direction with a flat strip of resistant material (steel). Preferably the wires are stranded around the lead sheathing and the flat strip of resistant material is wound thereon, since if the arrangement were reversed there would be a danger that the lead would be driven by the pressure existing in the interior of the cable or of the pipe into the intervening free spaces between the individual turns of the said flat strip, which intervening free spaces are produced by bending.

Figure 1:
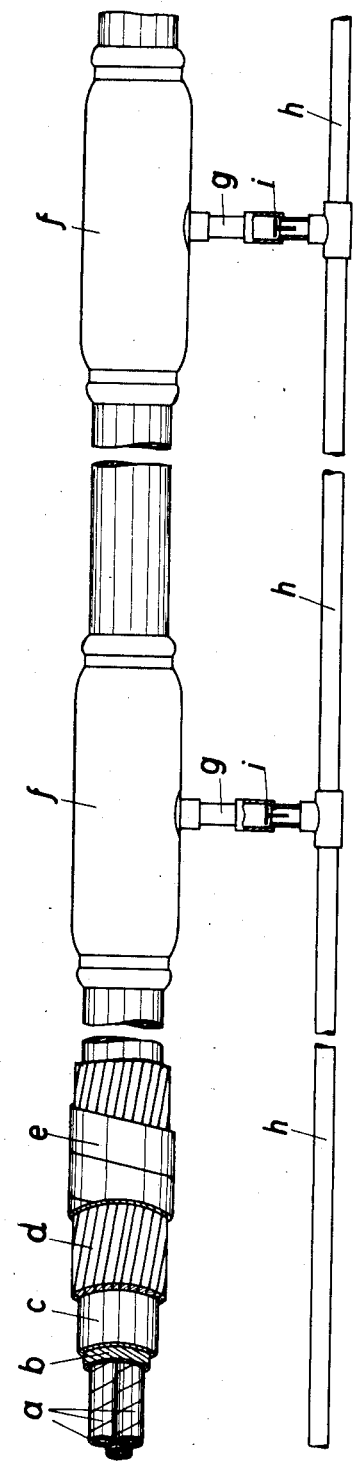
Fig. 1 is a general view of a cable section provided with a feeding pipe arranged parallel thereto and which is connected with the interior of the cable at the junction points.

In Fig. 1 a are the cores of the cable, b the belt insulation (which may be dispensed with when the cores are surrounded with a metal covering). c is the outer lead sheathing, d and e are the armouring of steel wires and flat strip of resistant material respectively. f is the cable junction sleeve or junction box. Pipes g are connected on to the junction box, the said pipes serving for connecting the cable junction (or the cable) with the lead pipe h which is arranged parallel to the cable. The connecting pipes g need not necessarily be connected on to the junction sleeves; they may open into the cable sheathing when the cable sections are large. *i* are the nonreturn valves which are provided for the purpose of preventing the oil from flowing back in the cable installation in consequence of its being heated; the said valves have been shown by way of example to be built in the connecting pipes *g*, although it is evident they may be somewhat differently arranged. The pipe *h* is connected at its ends, or preferably at its centre to one or more oil containers which are provided at a point higher than the cable. The oil container has not been shown, as the same is of secondary importance.

Figure 2:
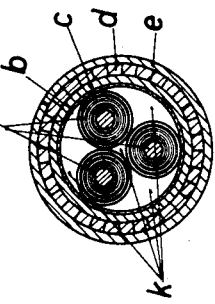
Fig. 2 illustrates in cross-section a cable such as used in the installation.

The reference letters indicated in connection with the cable shown in cross-section in Fig. 2 are the same as those used in Fig. 1. The free spaces between the individual cores of the cable which are not filled by strands and are intended to receive the oil are indicated at *k*.

Figure 3:
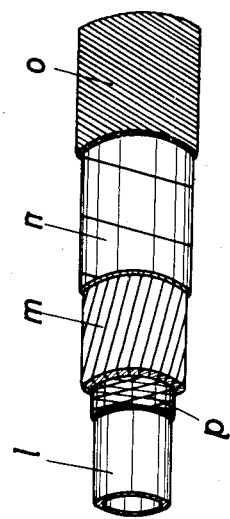
Fig. 3 shows the construction of the feeding pipe.

The feeding pipe illustrated in Fig. 3 consists of an inner lead pipe *l*, a layer of profile wires *m* which are stranded thereon, and a flat strip *n* which is wound thereon in the opposite direction. The armouring of the pipe is surrounded with a winding *o* of jute or hemp impregnated with tar for the purpose of protecting the pipe against chemical actions. It may be advisable to provide sometimes a layer of jute or paper *p* also over the lead sheathing between the same and the layer of profile wires.

What I claim is:—

Oil-filled cable installation comprising a multi-core electric cable in which the free spaces between the individual cores are substantially filled with oil, an oil pipe running parallel to the said cable and consisting of a flexible armoured lead pipe, and short transverse pipe connections at intervals between the said lead pipe and the said free spaces in the cable and constituting the only means for feeding additional oil to said cable, said transverse pipe connections having nonreturn valves therein to prevent the return flow of oil from said cable upon expansion of said oil due to increase in temperature thereof.

GEORG ZAPF.